Patented Nov. 18, 1941

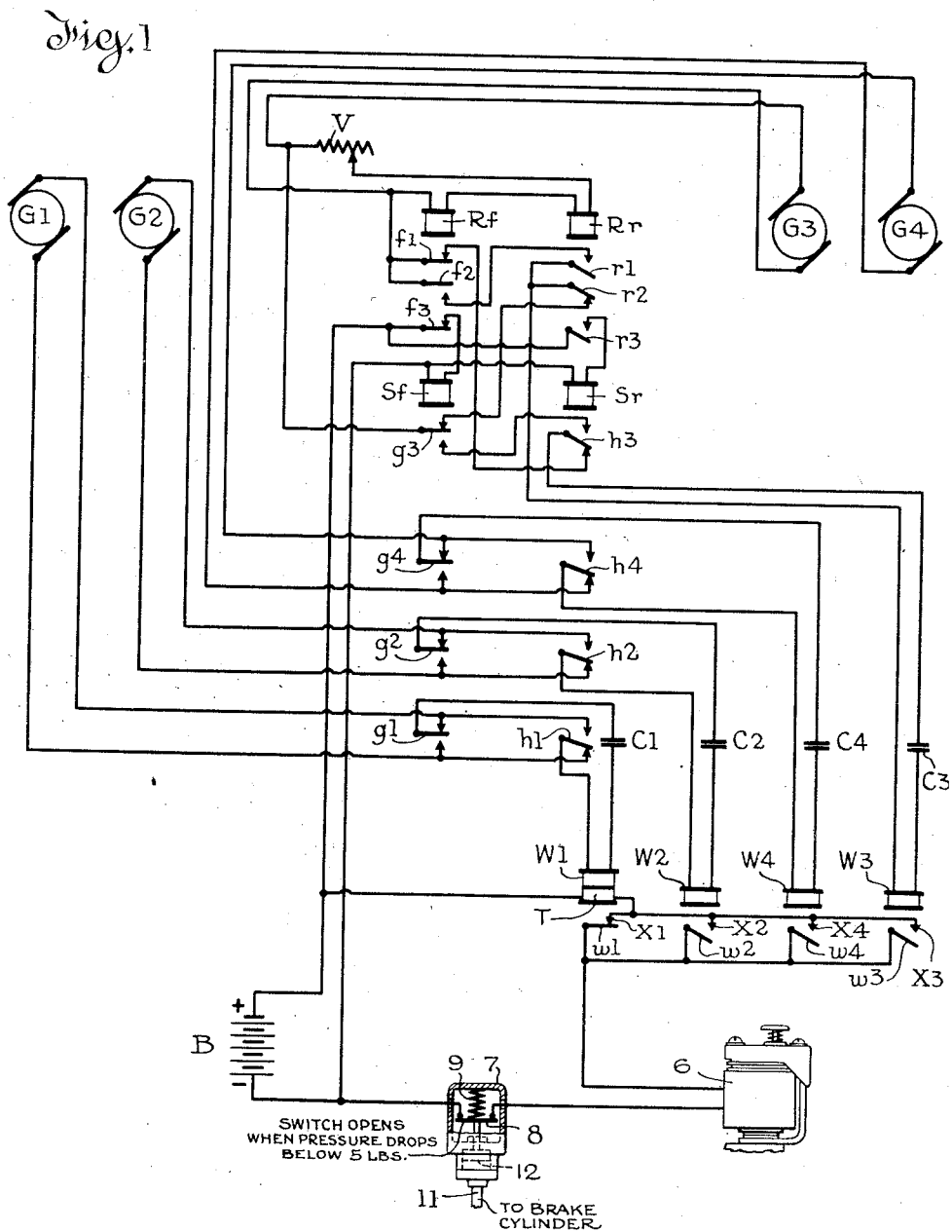

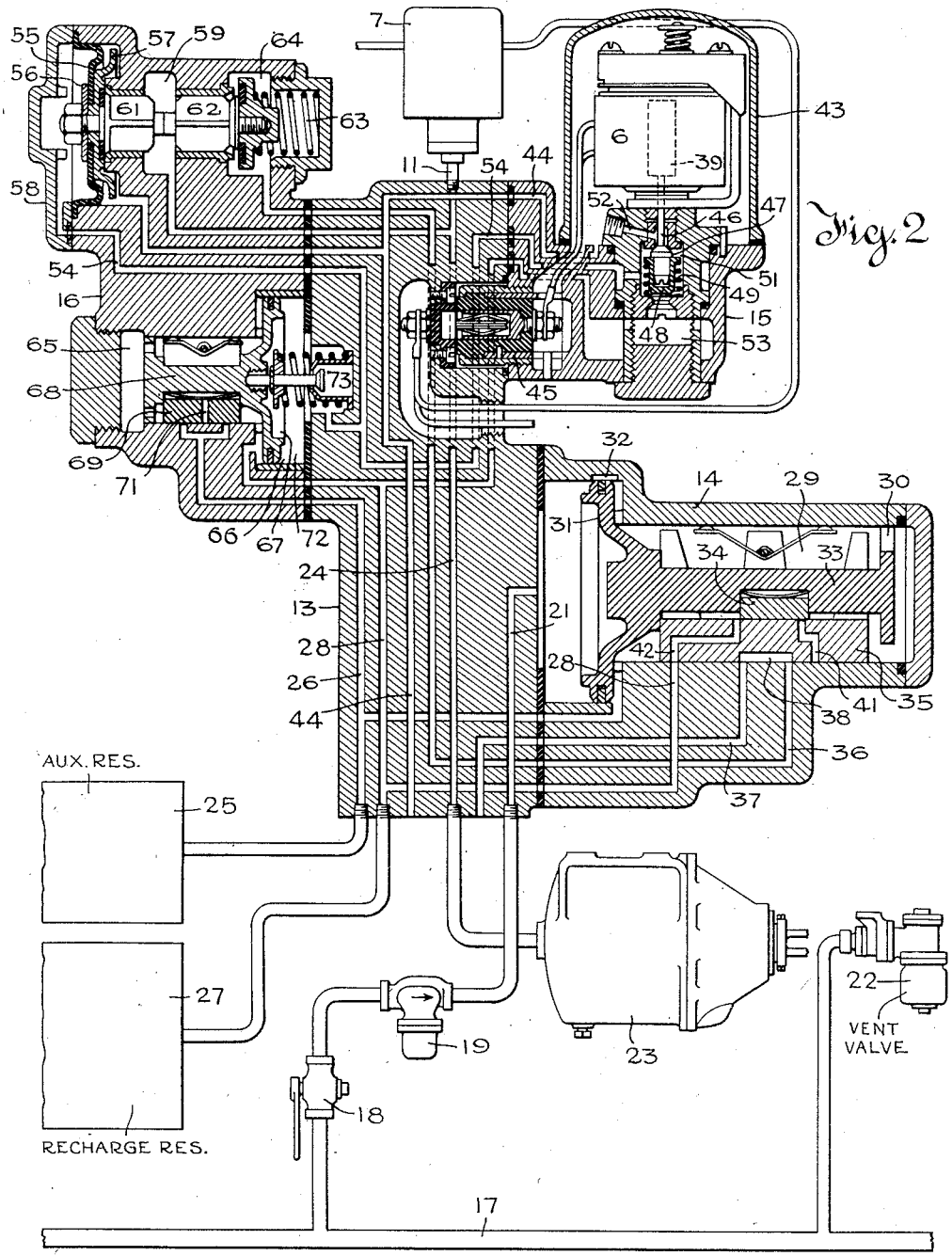

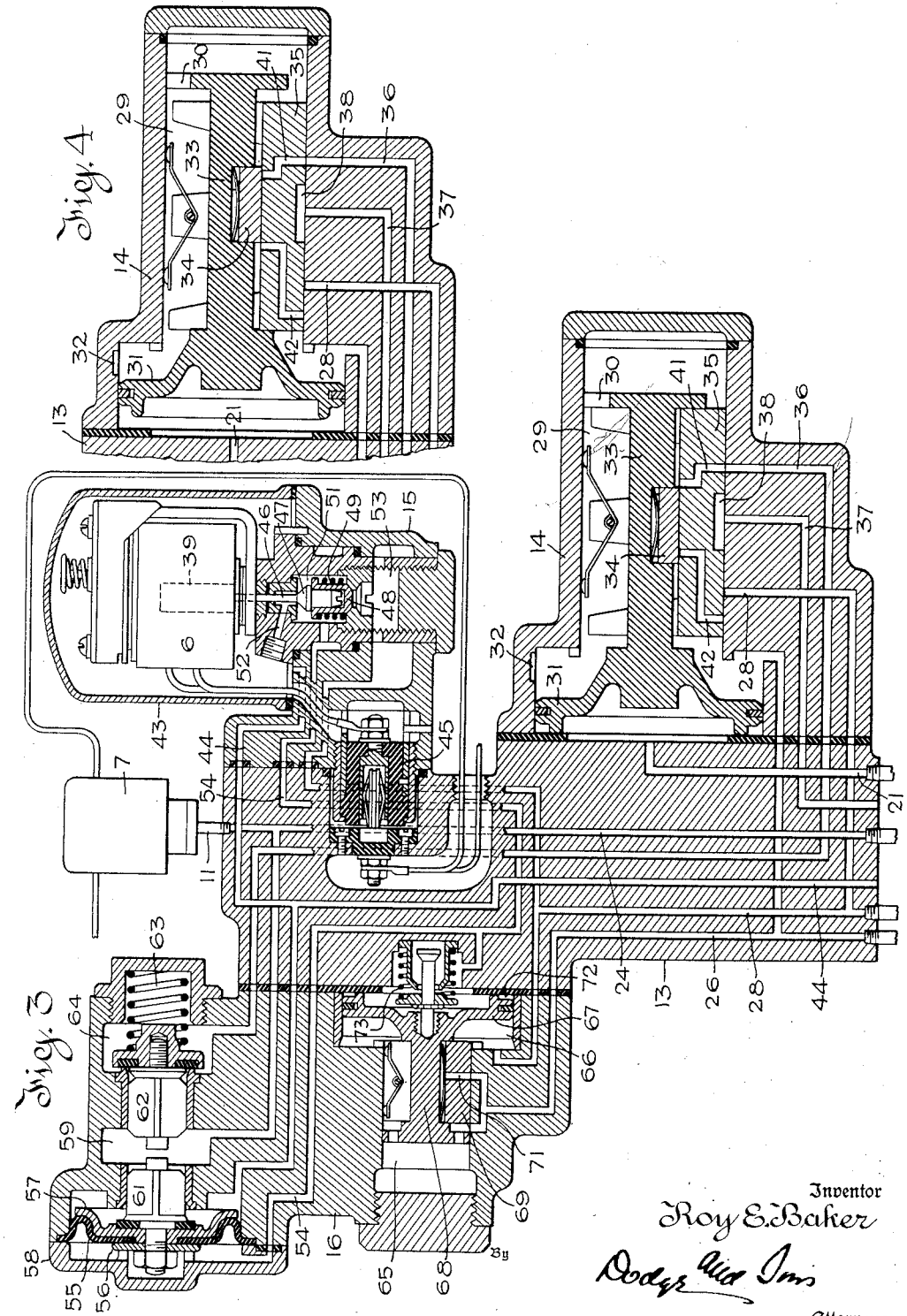

2,263,347

UNITED STATES PATENT OFFICE 2,263,347

AIR BRAKE

Roy E. Baker, Reading, Mass., assignor to The New York Air Brake Company, a corporation of New Jersey Application November 4, 1940, Serial No. 364,303

8 Claims. (Cl. 303—21)

This invention relates to air brakes and particularly to devices for preventing wheel sliding.

In the recent past there have been developed mechanisms making use of a so-called "decelostat" to release the brakes on any wheel which evidences a tendency to slide. The tendency to slide is distinctively indicated before sliding occurs by a sudden increase in the rate of deceleration of the rotary motion of the wheel. One known way of sensing this sudden increase of deceleration is to operate an electric relay switch in response to sudden changes of voltage of a small generator driven at wheel speed, the relay being unaffected by changes of voltage occurring at normal rates. When the relay switch responds, it operates a magnet valve which isolates the brake cylinder from the brake controlling valve device and vents the brake cylinder. The relay includes a sticker winding which maintains it in brake releasing position until the circuit controlled by the relay is interrupted by other means, usually taking the form of a so-called "K-3 switch," which responds to brake cylinder pressure and opens only when the pressure is so low that the brakes are virtually completely released.

There is difficulty in applying this scheme to an ordinary automatic brake, for example one of the type having a single auxiliary reservoir. Such a device will release the brake but cannot cause it to reapply when sliding is ended, for the reason that the equalizing characteristics of automatic brakes ordinarily leave the triple valve in lap position. The present invention extends the utility of the decelostat control to automatic brakes of that type in which there is some other source of air which may be used to recharge, and preferably only partially recharge, the auxiliary reservoir.

A typical example of brakes of this sort is the well-known UC brake in which, for example, the emergency reservoir may be drawn upon to recharge partially the service reservoir and the auxiliary reservoir, while the decelostat is operating to isolate and vent the brake cylinder. The partial recharge of the auxiliary reservoir will cause the brake controlling valve device to return to application position, if it be then in lap position, so that a reapplication will be had. Limited recharge will limit the reapplication to an intensity less than that which caused wheel sliding.

The invention, however, is not limited to the UC brake valve and because of the complexity of that valve and the fact that the principle can be illustrated in connection with a much simpler mechanism, no attempt will be made to illustrate the invention specifically as applied to the UC brake. Instead it will here be described as applied to a simple form of triple valve having an auxiliary reservoir and a secondary or recharge reservoir. This reservoir is charged through the triple valve and is capable of partially recharging the auxiliary reservoir during the period of time in which the decelostat is releasing pressure from a brake cylinder to arrest wheel sliding.

It should be understood that the recharge reservoir shown in connection with the drawings of the present application is intended to be typical of any available source of air under pressure.

The generator type of decelostat herein described is the invention of another and is not herein claimed, the present invention involving the combination of this mechanism, or any equivalent decelostat, with the special valve mechanisms for effecting the desired recharging and related functions.

In the drawings:

Figure 1 is a circuit diagram of the decelostat showing its relationship to the K-3 switch and the magnet valve (commonly called the EP valve).

Fig. 2 is a view partly in diagrammatic elevation and partly in section showing air brake equipment for one car and indicating the location of the K-3 switch. In this view the parts are shown in release and recharge position.

Fig. 3 is a view of the brake controlling valve device of Fig. 2 showing the triple valve portion in application position and other parts in the position assumed during wheel sliding to isolate the triple valve from the brake cylinder, vent the brake cylinder and connect the recharge reservoir with the auxiliary reservoir.

Fig. 4 is a fragmentary view similar to portions of Figs. 2 and 3 and showing the triple valve in lap position.

Passenger brake equipment on conventional cars, and this applies to the UC brake as well as the simplified brake hereinafter disclosed, has a single brake cylinder and brake controlling valve device which applies the brakes simultaneously to the wheels on a plurality of axles. For the present case it will be assumed that the car has two four-wheel trucks so that there are four axles and consequently four sets of braked wheels, the rotation of any one of which might be arrested independently of the others. Thus there will be needed four units for sensing the wheel sliding condition, each controlling the single mechanism which controls the brakes for the car. This assumption affects the entire discussion and should be kept in mind in considering the following description.

It should be appreciated, however, that just as the invention is disclosed for controlling, by a plurality of axles, the operation of a single braking unit, so also, by rearrangement or duplication a slide preventing control system might be associated with one or more axles braked by a single braking unit.

Reference will first be made to Fig. 1 which shows a known and commercially successful electrical decelostat for which no novelty is here claimed. In view of that fact only a very general description seems to be necessary.

G1, G2, G3 and G4 represent four D. C. generators so designed that the voltage generated by each bears a substantially proportional (straight line) relationship to generator speed. Each generator is driven by a corresponding one of the four axles of the car.

The position of the contacts illustrated on Fig. 1 is that which would be assumed if the wheels which drive generator G1 were about to slide, and the wheels which drive generators G2, G3 and G4 were running normally. Under these circumstances the brake control valve device would be in the position of Fig. 3 hereinafter discussed.

The generator G3 is given a secondary function not possessed by the other generators and this additional function is to reverse circuit connections according to opposite directions of car travel. This is necessary to permit the use of polarized relays and polarized relays are desirable because they will close in response to rapid deceleration and not in response to rapid acceleration such as may occur upon release of the brakes by the anti-sliding control.

For this reversing function the windings of two oppositely polarized relays R$f$ and R$r$ are connected in series across the terminals of the generator G3. Variable resistance V is inserted to adjust the pickup of the relays R$f$ and R$r$. The winding R$f$ affects three contactors $f1$, $f2$ and $f3$, and the winding R$r$ affects three contactors $r1$, $r2$ and $r3$. The relays R$f$ and R$r$ are sensitive relays and the contacts $f3$ and $r3$ function to connect selectively the windings S$f$ and S$r$ of heavier and more powerful relays into circuit with the car battery B. The winding S$f$ controls four sets of contactors $g3$, $g4$, $g2$ and $g1$. Similarly the winding S$r$ controls four contactors $h3$, $h4$, $h2$ and $h1$. The contactors $g3$ and $h3$ reverse the connections of the generator G3 with reference to the polarized relay W3. The contactors $g4$ and $h4$ perform the same function with reference to the winding of the polarized relay W4. Similarly $g2$ and $h2$ reverse the connections for the relay W2 and $g1$, $h1$ reverse those for the relay W1. Condensers C1, C2, C3 and C4 are interposed in the circuits between each of the generators G1, etc., and the corresponding polarized relays W1, etc. Contactors $f1$, $f2$, $r1$ and $r2$ reverse circuit connections as will be obvious from the diagram.

Each of the polarized relays W1 to W4 inclusive controls a corresponding contact $w1$, $w2$, $w3$ and $w4$, all of which are connected through the winding 6 of the EP valve and the K-3 switch 7 with one terminal of the car battery B. One of the relays of the W series has a second winding T. This is a sticker winding which will pick up and hold contactor $w1$ if any contactor $w2$, $w3$ or $w4$ closes. The second terminal of the battery B is connected through the sticker winding T with the four first contacts X1, X2, X3 and X4 with which the contacts $w1$, $w2$, $w3$ and $w4$ coact.

The switch 7, which is the so-called K-3 switch, has a pair of isolated contacts which, in the closed position of the switch, are bridged by a contactor 8. This contactor is lightly biased in a circuit breaking direction by the coil compression spring 9, but may be forced to circuit closing position by brake cylinder pressure of 5 lbs. or more admitted through the pipe 11 and acting on the piston 12, which is operatively connected with the contactor 8.

The operation of the electrical portion of the device can now be traced. The generator G3, according to its direction of rotation, causes one of the two sensitive relays R$f$ or R$r$ to pick up and the other to drop its contactors. This action causes the secondary relays S$f$ and S$r$ to function similarly. The effect is to connect each of the generators G1 to G4 inclusive with the corresponding polarized relays W1 to W4 inclusive, with due regard to the direction of rotation of the generator and the polarity of the corresponding relay.

When axle speed for any generator varies normally, that is when the wheel is rolling on the rail without slippage, the effect is to impose a charge, whose amount is a function of generator speed, on the corresponding condensers (C1, C2, C3 and C4). If, however, any generator suddenly decelerates, as it does when wheel sliding is about to commence, the condenser will deliver its charge to the winding of the corresponding polarized relay of the W series in such direction as to cause the relay to close. For example, it is assumed that generator G1 in Fig. 1 has suddenly decelerated. This caused the relay W1 to pick up the corresponding contactor $w1$, as shown. Since such deceleration could occur only during a brake application, the K-3 switch 7 must be closed. Consequently the closure of $w1$ against X1 closes the circuit from the battery through the sticker winding 6 of the EP switch through the K-3 switch and back to the battery B. The sticker coil T holds the circuit closed. It should be observed that the sticker coil would be effective if any other contactor, for example $w2$, were picked up. It follows that the winding 6 remains energized until the K-3 switch 7 opens. The spring 9 is so chosen that this switch will not open until brake cylinder pressure is almost completely dissipated. An opening value of 5 lbs. gauge or less is suitable.

It will be observed that release of the brakes may cause sudden acceleration of a slipping wheel, and consequently sudden acceleration of its generator, but since the relays W1 to W4 are polarized, acceleration will not cause such relay to pick up its contactor. It is for this reason that the relays W1 to W4 are of the polarized type and that the use of the reversing relays R$f$ and R$r$ is necessary.

The mechanism so far described is the invention of another and is typical of any device or a group of devices which will respond to sudden and marked deceleration of any axle to close the circuit through the EP winding 6, but will not perform this function in response to acceleration of any axle. While the electric device is considered to be superior, various inertia or other mechanical devices are known. Their use is within contemplation.

Referring now to Figs. 2 to 4, and particularly to Fig. 2, the general construction of the pneumatic portion of the mechanism will be described. An ordinary ported pipe bracket is indicated at 13 and to it all pipe connections are made according to practice standard in the art. Mounted on this bracket and appropriately sealed to it by a gasket, as shown, is the body 14 of the brake controlling valve device, here indicated as a simple triple valve including a piston, a main slide valve and a graduating valve. This triple valve has a release and recharge position shown in Fig. 2, an application position shown in Fig. 3, and a lap position, Fig. 4. Emergency functions could be provided by adoption of conventional expedients but these are omitted in the interests of simplicity.

Bolted to the pipe bracket 13 above the triple valve body 14 is the body 15 of an electro-pneumatic valve with interposed gaskets, as shown. Bolted to the opposite side of the pipe bracket 13 is a body 16 which encloses in its upper portion a combined intercepting and brake cylinder vent valve and in its lower portion a reservoir recharge valve. A sealing gasket is used as indicated in the drawing.

The passages formed in the bracket 13 communicate with extensions or branches in the bodies 14, 15 and 16, or certain of them, and where this is the case a single reference numeral will be used to identify each passage and all its branches so far as practicable.

The automatic brake pipe appears at 17 and is connected through a cut-out cock 18 and dust collector 19 with the brake pipe passage 21. An ordinary emergency vent valve 22 is shown connected to the brake pipe. The brake cylinder 23 is connected by a pipe with the brake cylinder passage 24. Auxiliary reservoir 25 is connected by a pipe with auxiliary reservoir passage 26 and the recharge reservoir 27 is connected by a pipe with the recharge reservoir passage 28. Passages 21, 24, 26 and 28 are formed wholly or partially in the pipe bracket 13 and the connections to these passages are clearly shown in Figs. 2 and 3.

The body 14 contains a slide valve chamber 29 and a cylinder in which works the triple piston 31. Brake pipe passage 21 leads to this cylinder on the outer side of the piston 31. There is the usual charging groove 32 which is open around the edge of the piston in release and recharge position. The piston 31 has a stem 33 which is guided by a spider 30 in the valve chamber 29. The stem 33 closely confines the graduating valve 34 so that it partakes of all the motions of the piston. The graduating valve is mounted on the back of the main slide valve 35 which has limited lost motion relatively to the piston, the range of lost motion being less than the piston travel.

The seat for the slide valve 35 has three ports which are controlled by the slide valve and these ports are the terminal portion of three passages; namely, an application and release passage 36 whose connection with the brake cylinder passage 24 is controlled by the intercepting valve as hereinafter explained, an atmospheric exhaust passage 37 and a branch of the recharging reservoir passage 28.

The slide valve 35 has an exhaust cavity 38 which, only in release position, Fig. 2, connects passages 36 and 37 to afford release. There is a through application port 41 which is controlled at its upper end by the graduating valve 34 and which registers at its lower end with the passage 36 when the triple piston is in application position, Fig. 3. At such times the graduating valve exposes the upper end of the port 41. In lap position, Fig. 4, the graduating valve 34 closes the upper end of the port 41, the piston 31 having then moved inward from application position the amount of the lost motion between the piston and the slide valve 35.

In the slide valve 35 there is also a through port 42. In release and recharge position (Fig. 2) this port registers with the recharge reservoir passage 28 and is exposed by the graduating valve so that the recharge reservoir is charged. As soon as the triple piston 31 starts outward, the graduating valve blanks the upper end of port 42. Motion of the slide valve to application position then moves port 42 out of register with the passage 28 and it remains out of register in lap position even though the upper end of the port 42 is then exposed by the end of the graduating valve (see Fig. 4).

It will be observed that in release and recharge position, Fig. 2, recharge reservoir 27 is charged from the slide valve chamber 29 and all charging air arrives through the charging groove 32. Both reservoirs are thus charged to the same pressure. On motion from application to release position, Fig. 2, the reservoir 27 assists in rapidly recharging the partially depleted auxiliary reservoir 25.

It will be observed that switch 7, the K-3 switch, is shown mounted on the bracket 13 and that the space under the piston 12 is in direct communication with the brake cylinder passage 24. In conjunction with the contactors w1 it controls the circuit through the winding 6. This winding 6 is mounted under a cap 43 on the housing 15 and the space within the cap is freely vented to atmosphere by the secondary exhaust passage 44 which extends through the bracket 13 and the housings 15 and 16. The passage 44 in the actual device is of large flow capacity. In the diagram its length is somewhat exaggerated. Its actual diameter is greater than that indicated in the diagram.

The assembly generally indicated at 45 is a commercial separable connector for the electric leads to and from the winding 6. The winding 6 operates an armature 39 connected to the stem 46 of a double-beat poppet valve made up of two nested components. The exhaust valve 47 is received within a cup-like admission valve 48. A coil compression spring 49 urges the admission valve in an opening direction and consequently urges the exhaust valve 47 closed. The spring is overpowered upon excitation of the winding 6.

Thus under normal conditions, when winding 6 is deenergized, chamber 51 is disconnected from the exhaust passage 52 and is connected with the chamber 53, to which a branch of the recharge reservoir passage 28 leads. Consequently chamber 51 and the passage 54 connected therewith are at the pressure existing in the recharge reservoir. This condition is shown in Fig. 2. When the winding 6 is excited, the valves 47, 48 shift to the position shown in Fig. 3 so that the chamber 51 and passage 54 are vented to atmosphere, valve 48 then protecting the charge in the reservoir 27 by closing communication with the chamber 53.

The combined intercepting and vent valve mechanism in housing 16 is operated by a pressure motor of the flexible diaphragm type, the motor diaphragm being indicated at 55. This is preferably a flexible diaphragm of the annular fold type clamped between thrust discs 56, 57 at its central portion, and clamped at its periphery between the body 16 and the removable cap 58. The space on the outer (left-hand) side of the diaphragm 55 is subject to the pressure in chamber 51 and connecting port 54. The space on the inner (right-hand) side of the diaphragm is connected to atmosphere by way of the secondary exhaust port 44.

The brake cylinder passage 24 leads to a chamber 59 which is between the seats of two oppositely seated poppet valves 61 and 62. The valve 61 is carried by the thrust plate 57 and controls communication between the chamber 59 and the secondary exhaust port 44. The poppet valve 62 is urged to its seat by a light coil compression spring 63 and controls communication between the chamber 59 and a chamber 64 with which a branch of the application and release passage 36 communicates. The two valves have thrust bosses, as shown, so that only one valve can close at a time.

Thus, when winding 6 is deenergized, as it normally is, and chamber 51 is at the pressure of the recharge reservoir, diaphragm 55 is forced inward, closing the exhaust valve 61 and holding the intercepting valve 62 open so that the application and release port 36 is in free communication with the brake cylinder port 24 by way of chamber 59. However, if the winding is energized so that chamber 51 is vented to atmosphere, motor diaphragm 55 becomes inert and the spring 63 seats the intercepting valve 62, in which position it holds the auxiliary exhaust valve 61 open. Thus, under normal conditions, the triple valve is connected to the brake cylinder and the secondary exhaust afforded by valve 61 is closed. However, if the winding 6 be energized, the triple valve is disconnected from the brake cylinder and the brake cylinder is vented rapidly to atmosphere. This operation is used to release pressure from the brake cylinder if any wheel starts to slide.

At such time it is desired to recharge the auxiliary reservoir from the recharge reservoir for two reasons; one, to furnish air for a re-application, and two, to make sure that if the triple valve has moved to lap position, Fig. 4, it will be shifted to application position, Fig. 3.

This function is performed by the recharge valve mechanism mounted in the lower portion of the housing 16. In this housing is a slide valve chamber 65 and the cylinder 66. In the cylinder there works a piston 67 whose stem 68 projects into and is guided in the valve chamber 65. The stem 68 operates without lost motion a slide valve 69. Branches of the auxiliary reservoir passage 26 terminate in the seat on which the slide valve 69 works and the slide valve controls these branches. For this purpose it has a through port 71, the parts being so dimensioned and arranged that when the piston 67 is in its inner or right-hand position, port 26 is connected with slide valve chamber 65.

The slide valve chamber 65, and consequently the space to the left of the piston 67, are connected with a branch of the recharge reservoir port 28. Hence under the conditions just stated, ports 26 and 28 are in free communication. The chamber 72 to the right of the piston 67 is in communication with the port 54 and chamber 51 of the electro-pneumatic valve. A coil compression spring assembly 73 urges the piston 67 to the left and in the left-hand position of Fig. 2 communication between the chamber 65 and port 26 is interrupted.

Assume that the train is proceeding with the parts in the position of Fig. 2. At such time the K-3 switch will be open and all the relay contactors w1 to w4 will be in their lower circuit breaking position. The reservoirs will be charged by flow from the brake pipe passage 21 through the charging groove 32. The auxiliary reservoir 25 is charged directly from the slide valve chamber 29, while the recharge reservoir 27 is charged through the charging port 42. Assume now that pressure in the brake pipe 17 is reduced to produce an application. The piston 31 moves outward and assumes the application position, illustrated in Fig. 3. This closes the exhaust port and the charging passage 29 to the recharge reservoir, and connects the slide valve chamber 29, and consequently the auxiliary reservoir, with the application and release port 36. At such time chamber 51 will be under recharge reservoir pressure because the winding 6 is deenergized. Consequently intercepting valve 62 is open and exhaust valve 61 is closed, and the recharge valve 69 is in its normal left-hand position.

In other words, all parts remain in the position of Fig. 2 except the triple valve, which moves to the position of Fig. 3. Remembering that the valve operates on the familiar equalizing principle, the triple valve may assume the lap position of Fig. 4, in which the graduating valve closes the application port 41.

With the triple valve parts either in the application position of Fig. 3 or the lap position of Fig. 4, assume that one of the four sets of braked wheels starts to slide. (Fig. 1 indicates that the set of wheels which drives generator G1 has started to slide.)

Operation of the decelostat causes one of the contactors w1 to w4 to pick up. In the particular instance shown in Fig. 1 it is w1, and the energization of the sticker winding holds the circuit closed. The development of 5 lbs. pressure in the brake cylinder port 24 has already closed K-3 switch 7 and thus the winding 6 is energized and stays energized until the K-3 switch 7 reopens. Energization of winding 6 causes the intercepting and supplemental exhaust valve mechanism and the recharge valve mechanism to assume the positions shown in Fig. 3. Admission valve 46 closes and exhaust valve 47 opens, hence pressure in chamber 51 falls to atmospheric, intercepting valve 62 closes, auxiliary exhaust valve 61 opens, and piston 67 shifts to the right, connecting the auxiliary reservoir port 26 with the recharge reservoir passage 28. Thus the triple valve is disconnected from the brake cylinder, the brake cylinder is rapidly vented to atmosphere, and the recharge reservoir is connected with the auxiliary reservoir.

When the K-3 switch 7 opens at a brake cylinder pressure of 5 lbs. or less, winding 6 and sticker coil T are deenergized and the intercepting and auxiliary exhaust valves and the recharge valve return to the positions of Fig. 2. It will be observed that the auxiliary reservoir will be partially but not completely recharged. Recharging will move the triple valve from lap position of Fig. 4 (if it be in that position) to the application position of Fig. 3. If the triple valve was in application position when wheel sliding started, it would remain there.

In any event the closing of the auxiliary exhaust valve 61 and reopening of valve 62 permits reapplication to occur and this reapplication is lighter than the original application which caused wheel sliding, because the auxiliary reservoir is only partially recharged. The brakes may be released in the ordinary way and in fact release through the triple valve can occur at any time since the load offered by the spring 82 is light and valve 62 would open to permit exhaust flow even if it be closed against application flow.

This scheme can be used with any automatic system in which a secondary supply is available to recharge the auxiliary reservoir during the intercepting and venting period. The use of a secondary reservoir is preferred because this offers a convenient way to limit the recharge of the auxiliary reservoir to a value less than the initial charge, thus reducing the tendency for wheel sliding to occur.

To facilitate an explanation of the principles of the invention a very simple triple valve has been used, but the principle can be applied to almost any type of automatic system having a secondary pressure source, and a typical example of such a system is the well known UC brake in which, as above suggested, the principle could be used to recharge the service reservoir and the auxiliary reservoir from the emergency reservoir, all of which are well known components of the UC brake. Various other automatic systems having more than one reservoir are well known and the invention is applicable to these also in accordance with the principles set forth.

The "decelostat" herein described is sensitive not merely to sudden changes in the rate of deceleration but is also sensitive to abnormally high deceleration rates. For applicant's purpose, it is essential that the device respond to some abnormal condition of deceleration which is indicative of impending wheel sliding. To define such a condition generally, the term "abnormal deceleration" is used in the claims in an inclusive sense.

I claim:

1. The combination of a normally charged brake pipe; a brake cylinder; an auxiliary reservoir; a brake controlling valve device including a valve actuating piston responsive to pressure differentials between the auxiliary reservoir and the brake pipe, said brake controlling valve device having a release position in which it exhausts the brake cylinder and connects the brake pipe in charging relation with the auxiliary reservoir, and an application position in which it isolates the brake pipe from the auxiliary reservoir, closes the brake cylinder exhaust and supplies pressure fluid to the brake cylinder; means affording a reserve supply of pressure fluid; means responsive to abnormal deceleration of a unit braked by said brake cylinder and upon such response serving to supply pressure fluid from said reserve supply to said auxiliary reservoir, isolate the brake cylinder from the brake controlling valve device and vent the brake cylinder; and means responsive to approximately complete release of the brakes to terminate the action of the last named means.

2. The combination of a normally charged brake pipe; a brake cylinder; an auxiliary reservoir; a brake controlling valve device including a valve actuating piston responsive to pressure differentials between the auxiliary reservoir and the brake pipe, said brake controlling valve device having a release position in which it exhausts the brake cylinder and connects the brake pipe in charging relation with the auxiliary reservoir, and an application position in which it isolates the brake pipe from the auxiliary reservoir, closes the brake cylinder exhaust and supplies pressure fluid to the brake cylinder; means affording a reserve supply of pressure fluid; means responsive to abnormal deceleration of a unit braked by said brake cylinder and upon such response serving to supply pressure fluid from said reserve supply to said auxiliary reservoir independently of said brake controlling valve device, isolate the brake cylinder from the brake controlling valve device and vent the brake cylinder; and means responsive to brake cylinder pressure and serving to inhibit action of the last named means except while brake cylinder pressure is above a chosen value.

3. In a fluid pressure brake, the combination of a normally charged brake pipe; a brake cylinder; an auxiliary reservoir; a second reservoir; a brake controlling valve device including a valve actuating piston responsive to pressure differentials between the brake pipe and the auxiliary reservoir, said valve device having a release position in which it exhausts the brake cylinder and connects the brake pipe in charging relation with said reservoirs and an application position in which it isolates the auxiliary reservoir from the brake pipe and from the second reservoir, closes the brake cylinder exhaust and supplies pressure fluid to the brake cylinder; means responsive to abnormal deceleration of a unit braked by said brake cylinder and upon such response serving to connect said reservoirs, isolate the brake cylinder from the valve device and vent the brake cylinder; and means responsive to substantially complete release of the brakes to terminate the action of the last named means.

4. In a fluid pressure brake, the combination of a normally charged brake pipe; a brake cylinder; an auxiliary reservoir; a second reservoir; a brake controlling valve device including a valve actuating piston responsive to pressure differentials between the brake pipe and the auxiliary reservoir, said valve device having a release position in which it exhausts the brake cylinder and connects the brake pipe in charging relation with said reservoirs and an application position in which it isolates the auxiliary reservoir from the brake pipe and from the second reservoir, closes the brake cylinder exhaust and supplies pressure fluid to the brake cylinder; means responsive to abnormal deceleration of a unit braked by said brake cylinder and upon such response serving to connect said reservoirs, isolate the brake cylinder from the valve device and vent the brake cylinder; and means responsive to brake cylinder pressure serving to inhibit the action of the last named means except while brake cylinder pressure is above a chosen value.

5. In a fluid pressure brake, the combination of a normally charged brake pipe; a brake cylinder; an auxiliary reservoir; a second reservoir; a brake controlling valve device including a valve actuating piston responsive to pressure differentials between the brake pipe and the auxiliary reservoir, said valve device having a release position in which it exhausts the brake cylinder and connects the brake pipe in charging relation with said reservoirs and an application position in which it isolates the auxiliary reservoir from the brake pipe and from the second reservoir, closes the brake cylinder exhaust and supplies pressure fluid to the brake cylinder; pressure motor operated valve means for connecting said reservoirs independently of said brake controlling valve device, isolating the brake cylinder from the brake controlling valve device and venting the brake cylinder; and electro-pneumatic means for operating and restoring said pressure motor operated valve means, comprising a switch responsive to abnormal deceleration of a braked element, a switch responsive to depletion of brake cylinder pressure and an electrically actuated valve controlled by said switches and in turn controlling the pressure motor operated valve means.

6. In a fluid pressure brake, the combination of a normally charged brake pipe; a brake cylinder; an auxiliary reservoir; a second reservoir; a brake controlling valve device including a valve actuating piston responsive to pressure differentials between the brake pipe and the auxiliary reservoir, said valve device having a release position in which it exhausts the brake cylinder and connects the brake pipe in charging relation with said reservoirs and an application position in which it isolates the auxiliary reservoir from the brake pipe and from the second reservoir, closes the brake cylinder exhaust and supplies pressure fluid to the brake cylinder; pressure motor operated valve means for connecting said reservoirs independently of said brake controlling valve device, isolating the brake cylinder from the brake controlling valve device and venting the brake cylinder; and electro-pneumatic means for operating and restoring said pressure motor operated valve means, comprising circuit controlling means responsive conjointly to abnormal deceleration of a brake element and to brake cylinder pressure, and an electrically actuated valve controlled by said circuit controlling means and in turn controlling the pressure motor operated valve means.

7. In a fluid pressure brake, the combination of a normally charged brake pipe; a brake cylinder; an auxiliary reservoir; a second reservoir; a brake controlling valve device including a valve actuating piston responsive to pressure differentials between the brake pipe and the auxiliary reservoir, said valve device having a release position in which it exhausts the brake cylinder and connects the brake pipe in charging relation with said reservoirs and an application position in which it isolates the auxiliary reservoir from the brake pipe and from the second reservoir, closes the brake cylinder exhaust and supplies pressure fluid to the brake cylinder; normally inactive motor operated valve means for connecting said reservoirs independently of said brake controlling valve device, isolating the brake cylinder from the brake controlling valve device and venting the brake cylinder; and means successively responsive to excessive deceleration of a braked element and to substantial release of the brakes for rendering said motor operated valve means active and restoring it to inactive condition.

8. The combination defined in claim 7 in which the motor of the motor operated valve means is of the fluid pressure type and the motive fluid is derived from the second reservoir.

ROY E. BAKER.

CERTIFICATE OF CORRECTION.

Patent No. 2,263,347.   November 18, 1941.

ROY E. BAKER.

It is hereby certified that error appears in the printed specification of the above numbered patent requiring correction as follows: Page 6, first column, line 28, claim 6, for "brake" first occurrence, read --braked--; and that the said Letters Patent should be read with this correction therein that the same may conform to the record of the case in the Patent Office.

Signed and sealed this 23rd day of December, A. D. 1941.

(Seal)

Henry Van Arsdale,
Acting Commissioner of Patents.